US008086877B2

(12) United States Patent
Ikejiri et al.

(10) Patent No.: US 8,086,877 B2
(45) Date of Patent: Dec. 27, 2011

(54) STORAGE DEVICE AND CONTROL METHOD FOR THE SAME

(75) Inventors: Keitaro Ikejiri, Fujisawa (JP);
Masataka Innan, Odawara (JP); Hideo Tabuchi, Odawara (JP)

(73) Assignee: Hitachi, Ltd., Tokyo (JP)

( * ) Notice: Subject to any disclaimer, the term of this patent is extended or adjusted under 35 U.S.C. 154(b) by 650 days.

(21) Appl. No.: 12/232,218

(22) Filed: Sep. 12, 2008

(65) Prior Publication Data

US 2010/0023685 A1    Jan. 28, 2010

(30) Foreign Application Priority Data

Jul. 28, 2008   (JP) ................................. 2008-193724

(51) Int. Cl.
*G06F 1/26* (2006.01)
*G06F 13/00* (2006.01)
*G06F 11/00* (2006.01)

(52) U.S. Cl. ........ 713/300; 713/320; 713/324; 711/111; 711/112; 711/113; 711/114

(58) Field of Classification Search .......... 711/111–114; 713/300, 320, 324
See application file for complete search history.

(56) References Cited

U.S. PATENT DOCUMENTS

| 2005/0091455 | A1 | 4/2005 | Kano et al. | |
| 2007/0079099 | A1* | 4/2007 | Eguchi | 711/170 |
| 2007/0250679 | A1* | 10/2007 | Umemura et al. | 711/170 |
| 2008/0229048 | A1* | 9/2008 | Murase et al. | 711/171 |
| 2009/0083558 | A1* | 3/2009 | Sugiki et al. | 713/320 |
| 2009/0119529 | A1* | 5/2009 | Kono et al. | 713/324 |
| 2009/0276588 | A1* | 11/2009 | Murase | 711/160 |

FOREIGN PATENT DOCUMENTS

| JP | 2003-015915 | 7/2001 |
| JP | 2007-293442 | 4/2006 |

OTHER PUBLICATIONS

Dell Systems—"Getting Started With RAID"; 16 pages, Dated Feb. 2003.*

* cited by examiner

*Primary Examiner* — Brian Misiura
(74) *Attorney, Agent, or Firm* — Stites & Harbison PLLC; Juan Carlos A. Marquez, Esq.

(57) ABSTRACT

A storage device is provided with: a first management section that manages a storage area provided by one or more hard disk drives on a basis of a predetermined unit created using one or more parameters; a second management section that manages, on a basis of a pool configured by at least one or more of the units, a management policy about the capacity of the pools and a threshold value of the storage capacity of the pools; a power supply control section that controls each of the hard disk drives of the unit under the management of the first management section to be in either a first turn-ON state or a second turn-ON state with a low power consumption; and a control section that selects, when the storage capacity of any of the pools exceeds the threshold value, the management policy of the pools, and any of the managed parameters considered optimum to serve as the unit of the storage area, and after making the power supply control section to change the state of the hard disk drive of the selected unit from the second turn-ON state to the first turn-ON state, adds the unit of the storage area to the capacity of the pool. With such a configuration, the storage device can achieve reduction of power consumption, simplification of management, and increase of use efficiency of storage resources.

12 Claims, 16 Drawing Sheets

FIG. 2

| STORAGE AREA NUMBER | PHYSICAL STORAGE AREA ALLOCATION YES/NO | PHYSICAL STORAGE AREA ID |
|---|---|---|
| P7151 | YES | Axxxx |
| P7152 | YES | Axxxy |
| ... | ... | ... |
| P7163 | NO | NULL |

| # | RAID LEVEL | HDD TYPE | HDD CAPACITY (GB) | ROTATION FREQUENCY | POWER SUPPLY STATE | FREE SPACE | ALLOCATED POOL# |
|---|---|---|---|---|---|---|---|
| 1 | RAID1(2D+2D) | FC | 73 | 15krpm | ON | xxx | 1 |
| 2 | RAID5(3D+1P) | FC | 73 | 15krpm | ON | xxx | 1 |
| 3 | RAID5(3D+1P) | FC | 146 | 15krpm | OFF | – | – |
| 4 | RAID1(2D+2D) | FC | 300 | 10krpm | OFF | – | – |
| 5 | RAID5(7D+1P) | FC | 300 | 15krpm | SLOW ROTATION MODE | – | – |
| 6 | RAID6(6D+2P) | FC | 300 | 15krpm | OFF | – | – |
| 7 | RAID5(3D+1P) | FC | 400 | 10krpm | OFF | – | – |
| 8 | RAID5(3D+1D) | SATA | 750 | 7.5krpm | OFF | – | – |
| 9 | RAID5(7D+1P) | SATA | 750 | 7.5krpm | OFF | – | – |
| 10 | RAID5(3D+1P) | SATA | 750 | 7.5krpm | ON | xxx | 2 |

410 420 430 440 450 460 470 480

| # | THRESHOLD VALUE (%) | TOTAL CAPACITY | POLICY | FREE SPACE | ALLOCATED RAID GROUP |
|---|---|---|---|---|---|
| 1 | 80 | xxx | PERFORMANCE CRITICAL | yyy | 1, 2 |
| 2 | 90 | xx | CAPACITY CRITICAL | yy | 10 |

510 520 530 540 550 560 / 500

STORAGE DEVICE AND CONTROL METHOD FOR THE SAME

CROSS REFERENCES TO RELATED APPLICATIONS

This application relates to and claims priority from Japanese Patent Application No. 2008-193724, field on Jul. 28, 2008, the entire disclosure of which is incorporated herein by reference.

BACKGROUND OF THE INVENTION

1. Field of the Invention

The present invention relates to a storage device and a control method therefor and, more specifically, is suitable when it is applied to a storage device storing data utilizing virtual volumes, and a method for controlling such a storage device.

2. Description of the Related Art

With a well-known technology for a storage system, virtual volumes consuming no physical storage area are defined, these virtual volumes are provided to a server, and allocation of the physical storage areas is performed at the time of actual data writing from the server, thereby increasing the use efficiency of the storage capacity of a storage device.

In another type of storage system, for increasing the use efficiency, any pools corresponding to virtual volumes are dynamically increased in storage capacity. For the purpose, a host computer monitors logical block address of a read or write I/O (Input/Output) for accessing logical volumes of a storage device, and based on any acquired logical block, the storage area of the logical volumes is dynamically extended. An example includes Patent Document 1 (JP-A-2003-15915). In still another type of storage system, the power needed for storage resources allocated to pools is reduced, and the storage resources are prevented from being reduced in life. An example includes Patent Document 2 (JP-A-2007-293442).

SUMMARY OF THE INVENTION

A virtual volume is created to a storage area referred to as pool, which is configured by one or more pool volumes each being a hard disk drive. Such pool volumes are exemplified by disk drives configuring an RAID group (Redundant Arrays of Inexpensive Disks). In such a configuration, if the storage capacity of a pool is not entirely used, i.e., not allocated as a virtual volume, as is provided large in advance, the pool volumes providing such unused storage areas also have to be always in operation, thereby increasing the power consumption.

Another problem here is that, once created, the storage capacity of a pool cannot be reduced even if the pool is found out as not carrying data that much for actual use during operation of a storage system. On the other hand, when the use rate of the storage capacity of the pool reaches a predetermined threshold value, an operator is required to increase the storage capacity of the pool in consideration of the application of the pool and the characteristics of the pool volumes. Moreover, when the storage capacity of the pool is used up, the virtual volumes allocated thereto will not become available for use, thereby causing a need to monitor frequently the use rate of the storage capacity of the pool.

Also in the storage system, when a plurality of pools are used on an application basis, the operator is required to select any of the pool volumes in the storage system for allocation to the pools with consideration given to the characteristics of the pool volumes such as capacity and performance, and add thus selected pool volumes respectively to the pools.

Moreover, for transferring data of virtual volumes, the volume being a transfer destination is required to have the same capacity as the volume being a transfer source. This causes consumption of a physical storage area in any area that is vacant in the volume of transfer source.

Furthermore, even after the data in any of the virtual volumes is deleted from the host computer, in the virtual volume, a physical storage area remains allocated to a page of the data, thereby consuming the physical storage area.

The invention is proposed in consideration of such problems, and an object thereof is to provide a storage system that can achieve reduction of power consumption, simplification of management, and increase of use efficiency of storage resources, and a method for controlling such a storage device.

An aspect of the invention is directed to a storage device that stores data from a host computer in one or more hard disk drives via a virtual volume. The storage device includes: a first management section that manages a storage area provided by the one or more hard disk drives on a basis of a predetermined unit created using one or more parameters; a second management section that manages, on a basis of a pool configured by at least one or more of the units under the management of the first management section, a management policy about the capacity of the pools and a threshold value of the storage capacity of the pools; a power supply control section that controls each of the hard disk drives of the unit under the management of the first management section to be in either a first turn-ON state or a second turn-ON state with a low power consumption; and a control section that selects, when the storage capacity of any of the pools exceeds the threshold value, the management policy of the pool, and any of the parameters considered optimum to serve as the unit of the storage area under the management of the first management section, and after making the power supply control section to change the state of the hard disk drive of the selected unit from the second turn-ON state to the first turn-ON state, adds the unit of the storage area to the capacity of the pool.

With such a configuration, when the storage capacity of any of the pools exceeds the threshold value, the control section selects the management policy of the pool, and any of the parameters considered optimum to serve as the unit of the storage area under the management of the first management section, and makes the power supply control section to change the state of the hard disk drive of the selected unit of the storage area from the second turn-ON state to the first turn-ON state, thereby adding the unit of the storage area to the capacity of the pool.

According to the invention, proposed is a storage device that can achieve reduction of power consumption, simplification of management, and increase of use efficiency of storage resources, and a method for controlling such a storage device.

BRIEF DESCRIPTION OF THE DRAWINGS

FIG. 2 is a diagram showing a storage area management table of the first embodiment;

FIG. 3 is a diagram showing a RAID group management table of the first embodiment;

DESCRIPTION OF THE PREFERRED EMBODIMENTS

In the below, embodiments of the invention are described by referring to the accompanying drawings. Note that the invention is surely not restrictive to the following embodiments.

First Embodiment

Figure 1:
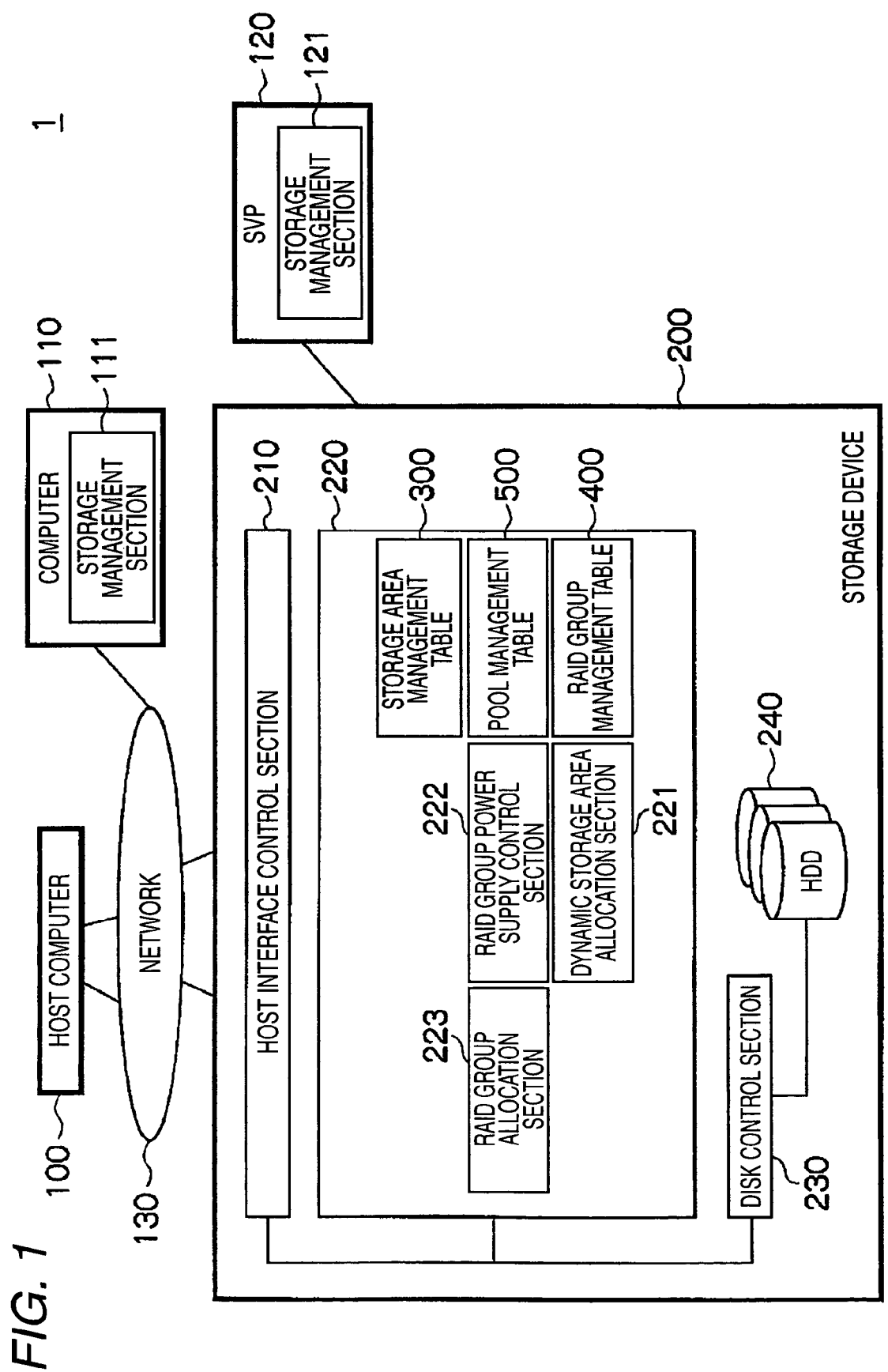
FIG. 1 is a diagram showing the entire configuration of a storage system in a first embodiment of the invention.

FIG. 1 is a diagram showing the entire configuration of a storage system. As shown in FIG. 1, a storage system 1 is configured to include a host computer 100, a computer 110, a maintenance terminal (SVP) 120, and a storage device 200. Among these components, i.e., the host computer 100, the computer 110, and the storage device 200, a connection is established over a network 130. The maintenance terminal 120 is connected to the storage device 200.

The host computer 100 executes various operations by running an application program (not shown), and stores the result in the storage device 200. That is, the host computer 100 writes data of operation results into the storage device 200 over the network 130, and when necessary, reads thus written data from the storage device 200.

The computer 110 manages the storage device 200 connected to the network 130. The maintenance terminal 120 is provided for maintenance use of the storage device 200. The computer 110 and the maintenance terminal 120 are provided with storage management sections 111 and 121, respectively. In this embodiment, exemplified is a case where the computer 110 and the maintenance terminal 120 are respectively provided with the storage management systems 111 and 121, but this is surely not the only option. Alternatively, the storage management section may be provided to either the computer 110 or the maintenance terminal 120 in the storage system. Herein, the storage management sections 111 and 121 operate similarly to each other, and the details thereof are left for later description.

The storage device 200 is configured to include an interface control section 210, a memory 220, a disk control section 230, and a hard disk drive (HDD) 240. The interface control section 210 controls data exchange between the host computer 100 and the computer 120. The memory 220 includes areas for storage of various types of components and tables, i.e., a dynamic storage area allocation section 221, a RAID group power supply control section 222, a RAID group allocation section 223, a storage area management table 300, a RAID group management table 400, and a pool management table 500. The disk control section 230 controls over data writing to the hard disk drive 240 and data reading therefrom.

The dynamic storage area allocation section 221 executes a process of dynamically allocating the storage areas. The RAID group power supply control section 222 performs power saving control on a RAID group basis. The RAID group allocation section 223 executes a process of allocating the RAID groups to the host computer 100. Herein, the storage contents in the tables, i.e., the storage area management table 300, the RAID group management table 400, and the pool management table 500, will be described later.

FIG. 2 is a diagram showing the storage area management table 300. The storage area management table 300 carries information entered about physical storage areas for allocation to the host computer 100. The storage area management table 300 includes a storage area number field 310, a physical storage area allocation YES/NO field 320, and a physical storage area ID field 330.

The storage area number field 310 stores numbers respectively assigned to the storage areas. The physical storage area allocation field 320 stores information about whether the host computer 100 is allocated with a physical storage area or not. When the host computer 100 is allocated with, as a physical storage area, the storage area identified by the storage area number, the physical storage area allocation field 320 stores "YES", and when not allocated, the field 320 stores "NO". The physical storage area ID field 330 stores IDs (Identifiers) of the physical storage areas.

In the storage area management table 300, various types of information is stored in a line, e.g., the storage area number field 310 stores "P7151", the physical storage area allocation field 320 stores "YES", and the physical storage area ID field 330 stores "Axxxx".

FIG. 3 is a diagram showing the RAID group management table 400. The RAID group management table 400 manages the RAID groups. The RAID group management table 400 includes a number field 410, a RAID level field 420, a hard disk drive type field 430, a hard disk drive capacity field 440, a rotation frequency field 450, a power supply state field 460, a unused capacity field 470, and an allocated pool number field 480.

The number field 410 stores numbers of the RAID groups. The RAID level field 420 stores information about RAID levels such as RAID 1. The hard disk drive type field 430 stores information about the type of the hard disk drive 240, e.g., "FC (Fiber Channel)" and "SATA (Serial Advanced Technology Attachment)". The hard disk drive capacity field 440 stores information about the capacity (GB: Giga Byte) of the hard disk drive 240. The rotation frequency field 450 stores information about the rotation frequency of the hard disk drive 240. The power supply state field 460 stores information indicating the state of a power supply, e.g., "ON", "slow rotation mode", and "OFF". Herein, "ON" indicates the state that the power supply is normally turned ON. With the "slow rotation mode", disk rotation is made slower than the speed at the time of normal disk startup for power saving, and with the "OFF", disk rotation is stopped for power saving but the power supply is turned ON to receive commands and others. Note that, in this embodiment, exemplified as the state of power saving are these two states, i.e., "slow rotation mode" and "OFF", but the state of power saving is surely not restrictive thereto. The free space field 470 stores information indicating the free spaces by specific values. Herein, when the host computer 100 is not allocated with a physical storage area, the information about the free spaces is not stored. The allocation pool number field 480 stores information indicating numbers of pools allocated with a physical storage area.

In the RAID group management table 400, various types of information is stored in a line, e.g., the number field 410 stores "1", the RAID level field 420 stores "RAID1(2D+2D)", the hard disk drive type field 430 stores "FC", the hard disk drive capacity field 440 stores "73", the rotation frequency field 450 stores "15 krpm", the power supply state field 460 stores "ON", the free space field 470 stores "XXX (value indicating the free space)", and the allocation pool number field 480 stores "1".

Figures 4, 5:
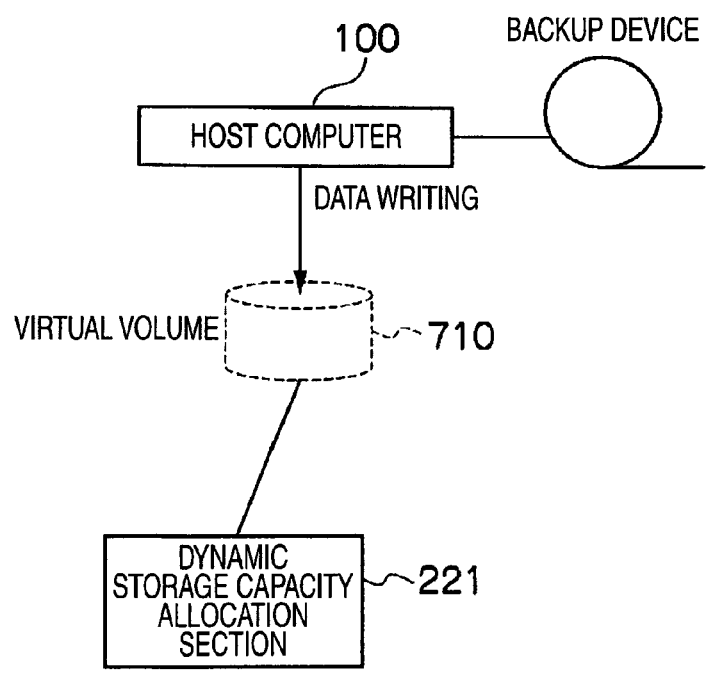
FIG. 4 is a diagram showing a pool management table of the first embodiment.
FIG. 5 is a diagram for illustrating a dynamic storage area allocation process of the first embodiment.

FIG. 4 is a diagram showing the pool management table 500. The pool management table 500 is provided for management of pools provided from the storage areas of the hard disk drive 240. The pool management table 500 includes a number field 510, a threshold value field 520, a total capacity field 530, a policy field 540, a free space field 550, and an allocated RAID group field 560.

The number field 510 stores numbers of pools. The threshold value field 520 stores information about a threshold use rate of the storage capacity of each of the pools. The total capacity field 530 stores information about the capacity of each of the pools. The policy field 540 stores information about policies. These policies each indicate how to perform control over each of the RAID groups, and the details thereof are left for later description. The free space field 550 stores information indicating the free space. The allocated RAID group field 560 stores information about any allocated RAID group.

In the pool management table 500, various types of information is stored in a line, e.g., the number field 510 stores "1", the threshold value field 520 stores "80", the total capacity field 530 stores "XXX", the policy field 540 stores "performance critical", the free space field 550 stores "yyy (value indicating the free space)", and the allocated RAID group field 560 stores "1, 2".

Described now is the policies to be stored in the policy field 540. There are four policies available for an operator to set, i.e., "performance critical", "capacity critical", "power saving critical", and "reliability critical". By each of these policies, RAID group parameters are specified for use as determination criteria, i.e., parameters under the management of the RAID group management table 400. For a case when a plurality of such parameters are used as a basis for a policy determination, parameters are each assigned a priority to indicate which parameter is more critical.

With a policy of "performance critical", the priority precedence is: "hard disk type (FC or not)", "rotation frequency (high or not)", "capacity (large or not)", and "RAID level (RAID1>6>5)". With a policy of "capacity critical", the priority precedence is: "hard disk capacity (large or not)", and "RAID level (RAID5>6>1, and a few number of hard disk drives?)". With a policy of "power saving critical", the priority precedence is: "rotation frequency (low or not)", "hard disk capacity (large or not)", "RAID level (a few number of hard disk drives?), and "RAID level 5>6>1)". With a policy of "reliability critical", the priority precedence is: "hard disk type (FC or not)", and "RAID level (RAID1>6>5)".

The RAID group allocation section 223 selects any of the RAID groups considered most suitable for each of the policies. Such a selection is made based on the information stored in the power supply state field 460 of the RAID group management table 400. As such, with the determination criteria described above, the RAID group to be selected from those exemplified in the RAID group management table 400 is the RAID group #3 if with the policy of "performance critical", the RAID group #9 if with the policy of "capacity critical", the RAID group #8 if with the policy of "power saving critical", and the RAID group #4 if with the policy of "reliability critical". Note that these policies are surely not restrictive, and an operator may create his or her own policies by setting any arbitrary determination criteria, e.g., parameters and priority precedence.

Figure 6:
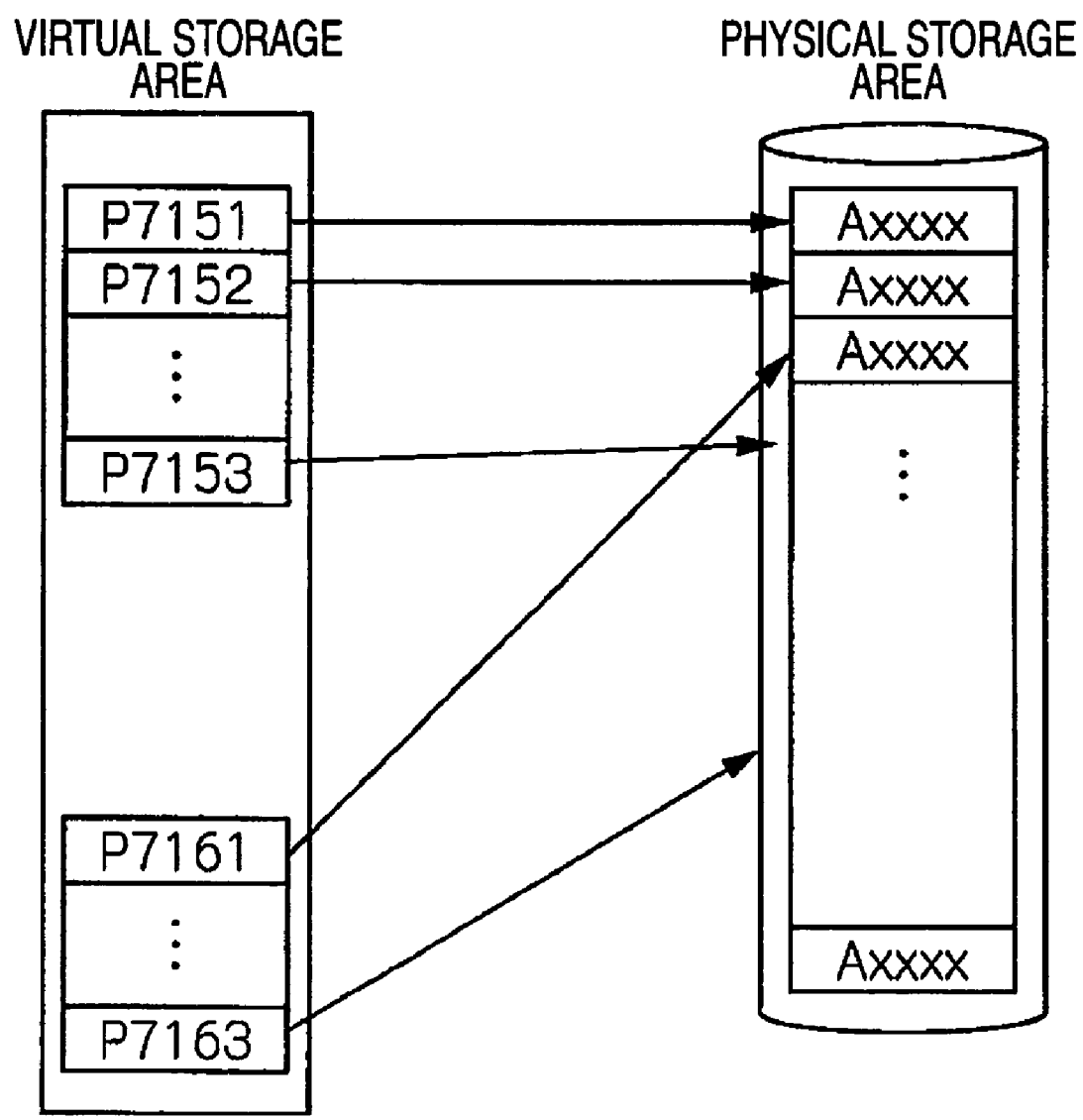
FIG. 6 is a diagram showing the relationship between a virtual storage area of a virtual volume and a physical storage area storing physical data of the first embodiment.

Described next is the process of the dynamic storage area allocation section 221, i.e., process of automatically allocating storage areas to the host computer 100. FIG. 5 is a diagram for illustrating such a dynamic storage area allocation process. FIG. 6 is a diagram showing the relationship between a virtual storage area of a virtual volume and a physical storage area for storage of physical data. Note that the dynamic storage area allocation process is sometimes referred to as HDP (Hitachi Dynamic Provisioning) or thin provisioning.

As shown in FIG. 5, for data writing from the host computer 100 into a virtual volume, the dynamic storage area allocation section 221 performs dynamic allocation of a physical storage area as shown in FIG. 6. During data update in any allocated area, the data in storage is updated. When a read request is provided to the area not yet allocated with a physical storage area, "0" is forwarded to the host computer 100 as a response to indicate no physical storage area is allocated. Note that such write and read processes are executed using the storage area management table 300 described above.

Figure 7:
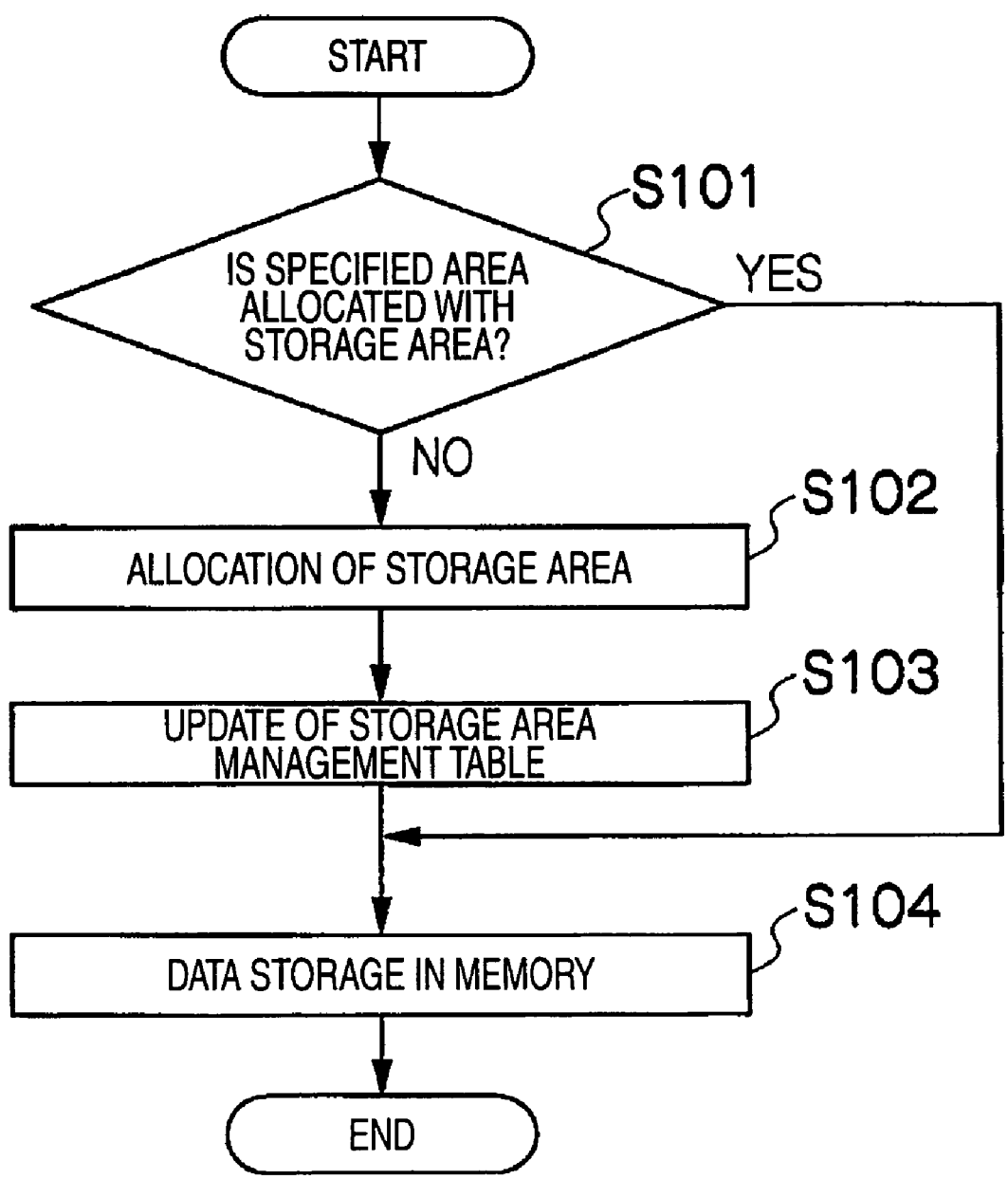
FIG. 7 is a flowchart of a process at the time of writing by a dynamic storage area allocation section of the first embodiment.
Figure 8:
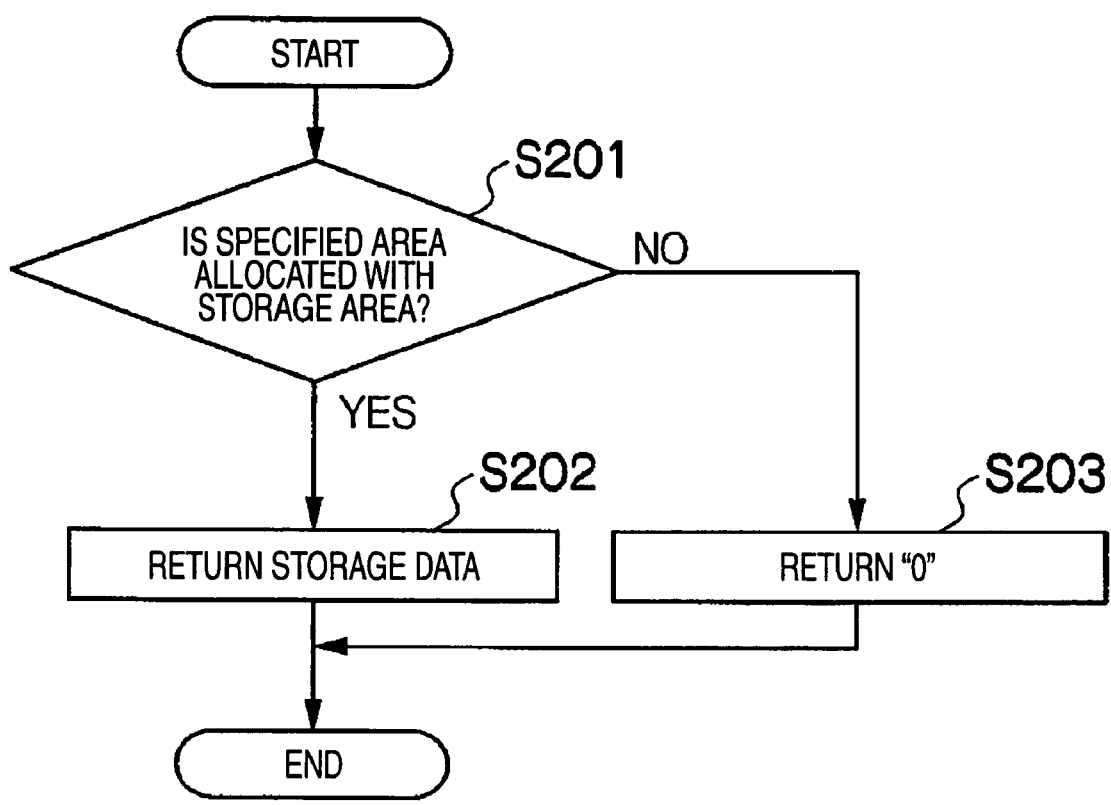
FIG. 8 is a flowchart of a process at the time of reading by the dynamic storage area allocation section of the first embodiment.

Described next are the write and read processes to be executed by the dynamic storage area allocation section 221. FIG. 7 is a flowchart of a process during writing of the dynamic storage area allocation section 221. FIG. 8 is a flowchart of a process during reading of the dynamic storage area allocation section 221.

As shown in FIG. 7, in step S101, the dynamic storage area allocation section 221 determines whether an area of write data specified by the host computer 100 is already allocated with a storage area or not. When the specified area is not yet allocated with a storage area (S101: NO), the procedure goes to step S102, and the dynamic storage area allocation section 221 performs allocation of a storage area, and then in step S103, updates the storage area management table 300.

When the storage area management table 300 is updated (S103), or when the specified area is determined as not yet being allocated with a storage area (S101: YES), the procedure goes to step S104. In step S104, the dynamic storage area allocation section 221 stores the data in the memory 220. This is the end of the write process. Note that the data stored in the memory 220 is then written into the hard disk drive 240 by the disk control section 230.

As shown in FIG. 8, in step S201, the dynamic storage area allocation section 221 determines whether an area of read data specified by the host computer 100 is already allocated with a storage area or not. When the specified area is already allocated with a storage area (S201: YES), the procedure goes to step S202, in step S202, and the dynamic storage area allocation section 221 returns the stored data to the host computer 100. When the specified area is not yet allocated with a storage area (S201: NO), in step S203, the dynamic storage area allocation section 221 returns "0" to the host computer 100. This is the end of the read process.

Figure 9:
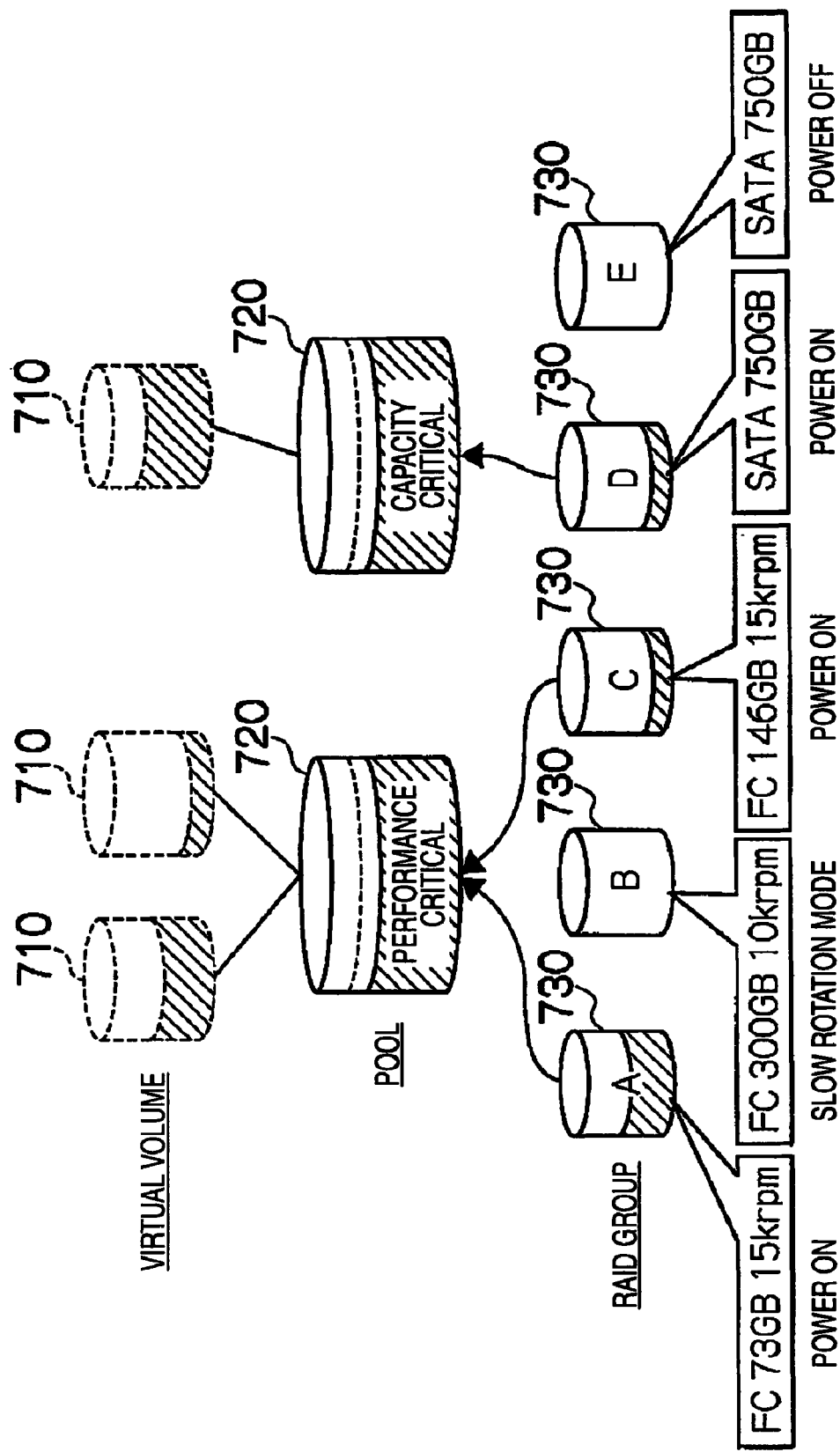
FIG. 9 is a diagram for illustrating the relationship among virtual groups, pools, and RAID groups (pool volumes) of the first embodiment.

By referring to FIGS. 9 to 11, described next are a pool capacity increase process and a pool capacity reduction process. Herein, the pool capacity increase process and the pool capacity reduction process are to be executed by the RAID group allocation section 223.

First of all, described is the configuration of storage resources to be provided to the host computer 100 by the storage device 200. FIG. 9 is a diagram for illustrating the relationship among virtual volumes, pools, and RAID groups (pool volumes).

A pool is set corresponding to a virtual volume 710. As shown in FIG. 9, for example, one pool 720 is associated with two virtual volumes, and another pool 720 is associated with one virtual volume. These pools 720 are each also associated with RAID group(s) corresponding to a policy set thereto. To be specific, the pool 720 with a policy of "performance critical" is associated with RAID groups 730A and 730C, and the pool 720 with a policy of "capacity critical" is associated with a RAID group 730D. A RAID group 730B is in the "slow rotation" mode, and a RAID group 730E is in the "OFF" state, i.e., both are in the state of power saving.

Figure 10:
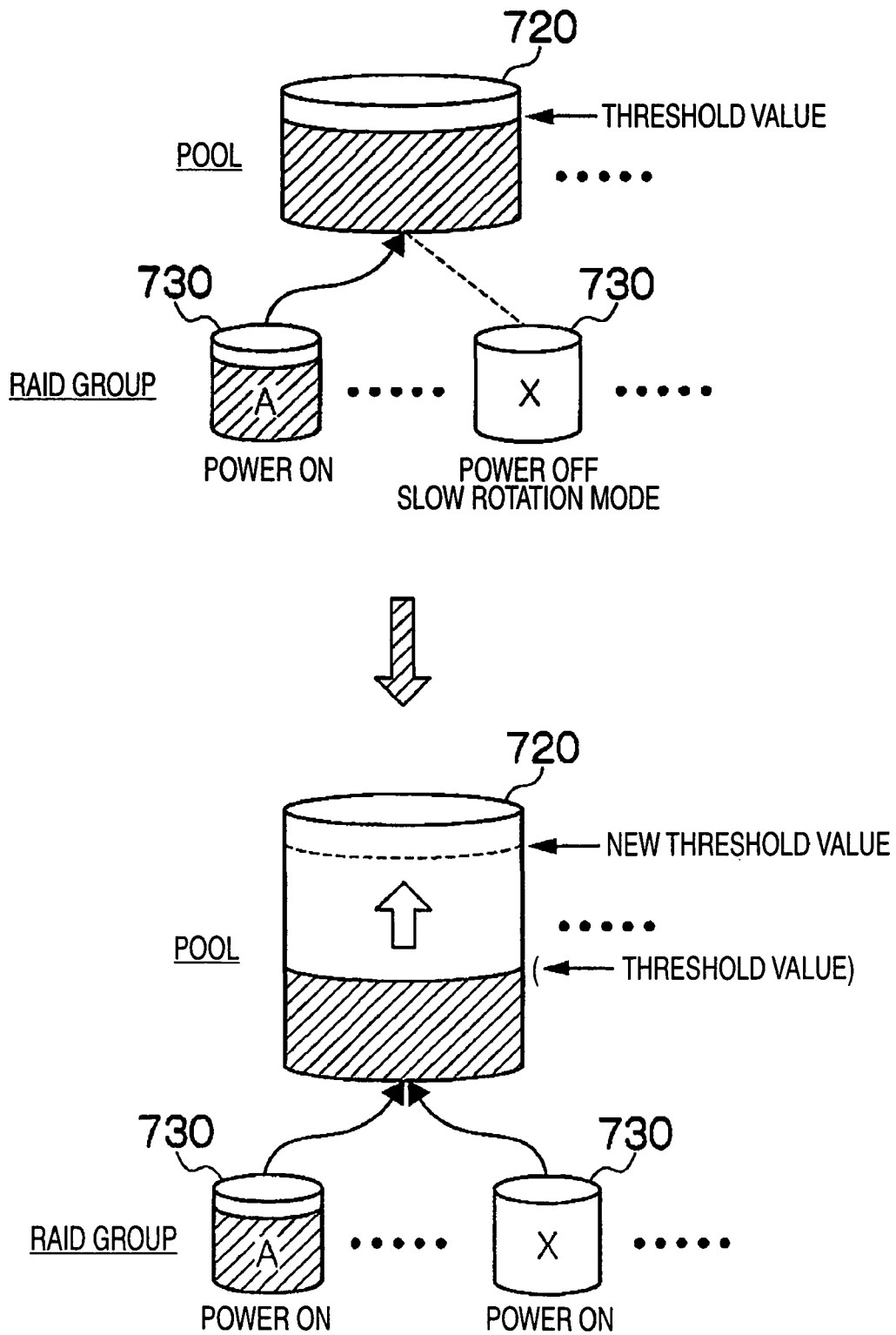
FIG. 10 is a diagram for illustrating a pool capacity increase process of the first embodiment.

FIG. 10 is a diagram for illustrating the pool capacity increase process. As shown in the upper portion of FIG. 10, the pool 720 is provided with a storage area from the RAID group 730A, and is set with a threshold value as described by referring to the pool management table 500. When data stored in this pool 720 exceeds the threshold value, the RAID group 730 in the "OFF" state or in the "slow rotation" mode is searched for any RAID group most suitable for the policy of the pool 720, and using thus found RAID group, i.e., RAID group 730X, the pool capacity is increased.

That is, the RAID group 730X is put in the state of "ON", and as shown in the lower portion of FIG. 10, the pool 720 is now provided with a storage area each from the RAID groups 730A and 730X. The pool 720 is thus increased in capacity by the RAID group 730X, and thus a new threshold value is set to the pool management table 500. When the data stored in the pool 720 exceeds the new threshold value set as such, a process similar to the above process is to be executed. In this manner, the pool capacity increase process is automatically executed.

Figure 11:
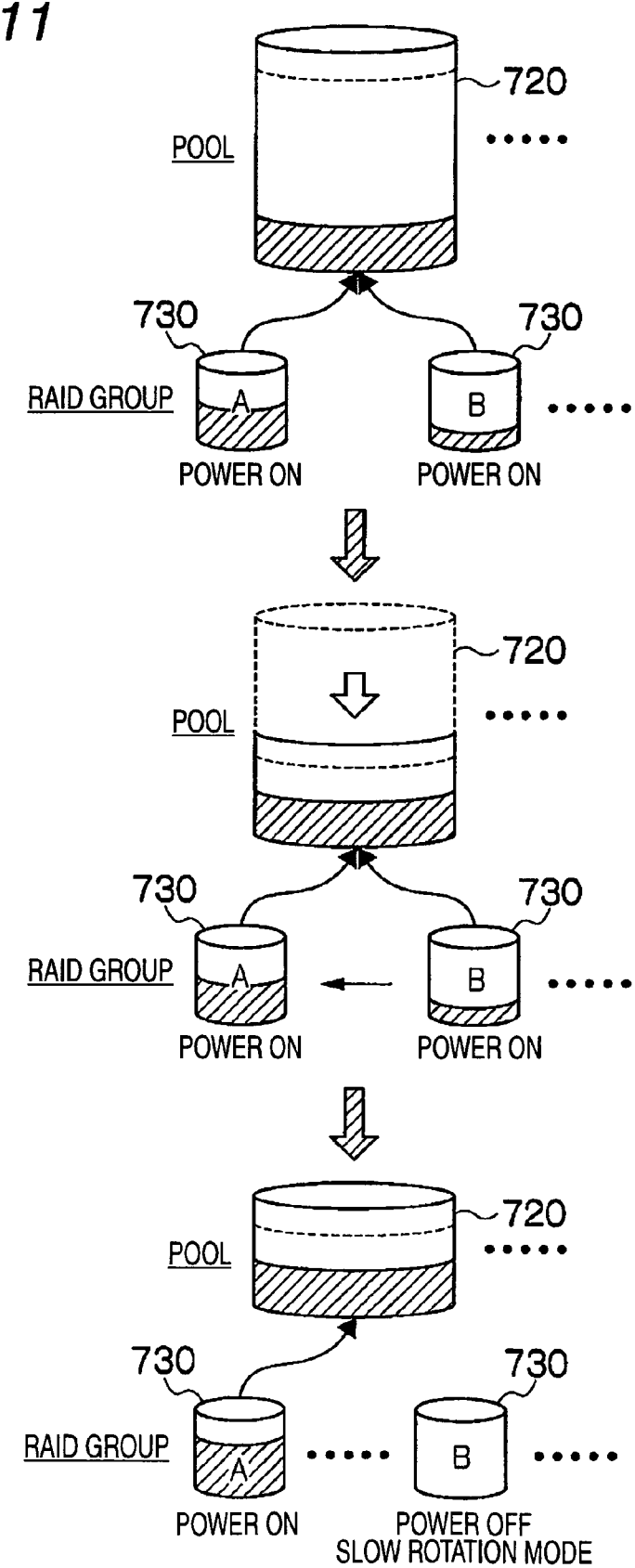
FIG. 11 is a diagram for illustrating a pool capacity reduction process of the first embodiment.

FIG. 11 is a diagram for illustrating the pool capacity reduction process. As shown in the upper portion of FIG. 11, the pool 720 is provided with a storage area from the RAID groups 730A and 730B. When the use rate of the pool 720 satisfies criteria for capacity reduction, a search is made for any of the RAID groups 730 as a target for capacity reduction based on the policy of the pool 720. Assuming that the RAID groups 730A and 730B share the same priority based on the pool, when the RAID group 730A stores data larger in amount than the RAID group 730B, the RAID group 730B is the target for capacity reduction.

Next, as shown in the middle portion of FIG. 11, executed is a process of reducing the capacity of the pool 720, and transferring the data stored in the RAID group 730B to the RAID group 730A.

Thereafter, as shown in the lower portion of FIG. 11, after completion of data transfer as such, the RAID group 730B is put in the "OFF" state or in the "slow rotation" mode, i.e., put in the state of power saving. In this manner, the pool capacity reduction process is automatically executed.

Figure 12:
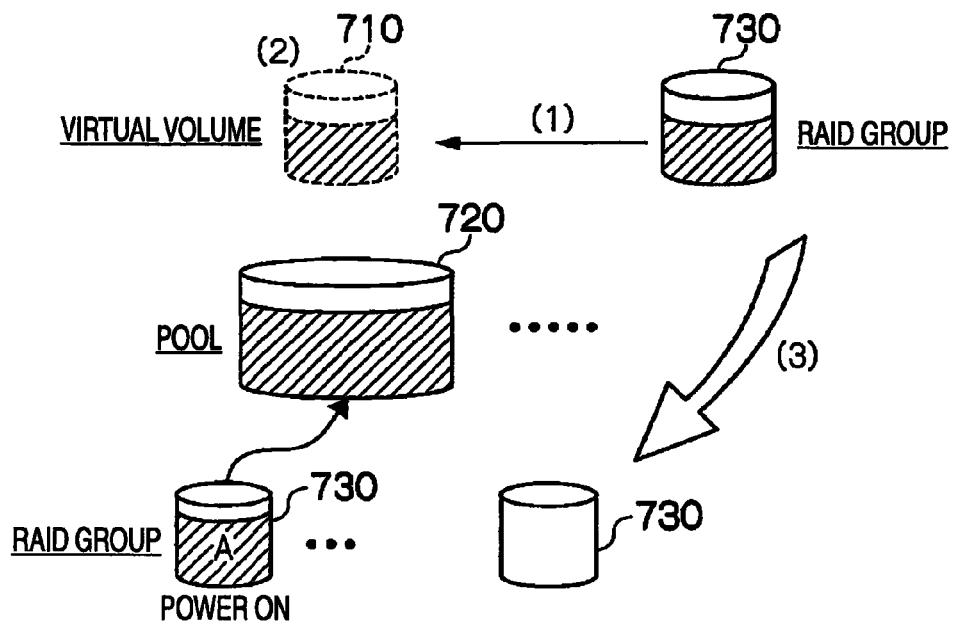
FIG. 12 is a diagram for illustrating a zero data deletion process of the first embodiment.

Described next is a zero data deletion process during data transfer of FIG. 11. FIG. 12 is a diagram for illustrating this zero data deletion process.

In the virtual volume 710, zero data is deleted (2 in FIG. 12). This zero data is the one written when data transfer is taken place from the normal volume (RAID group) 730 to the virtual volume 710 (1 in FIG. 12). This zero data is deleted by deleting any page being entirely "0". The page here is a unit for management of data of a hard disk drive. With such data deletion, any extra data allocated to a physical storage area can be deleted, thereby being able to increase the efficiency of the storage capacity of the pool 720. The RAID group being the transfer source is added to the RAID group of shared use, and the resulting RAID group is put in the "OFF" state or in the "slow rotation" mode (3 in FIG. 12). In this manner, the RAID group being the transfer source can be used again as the capacity of the pool, thereby being able to increase the use efficiency of the physical storage area and achieve power saving.

Figure 13:
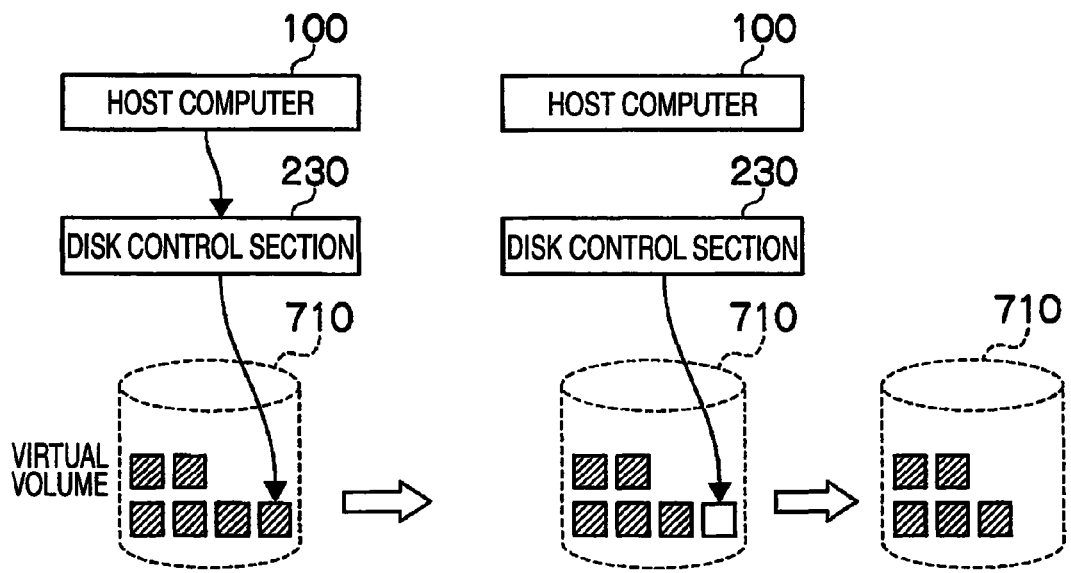
FIG. 13 is a diagram for illustrating a release process of the first embodiment.

Described next is an allocated area release process during data deletion. FIG. 13 is a diagram for illustrating this release process.

The host computer 100 issues a command for deleting the data in the virtual volume 710, and a command for the disk control section 230 to release any area in the virtual volume 710 allocated with data (left portion of FIG. 13). In response, the disk control section 230 releases the area in the virtual volume 710 allocated with the data (center portion of FIG. 13). As a result, the unused area in the virtual volume 710 is increased (right portion of FIG. 13). Herein, for area release as such, an SCSI (Small Computer Systems Interface) command is used.

Figure 14:
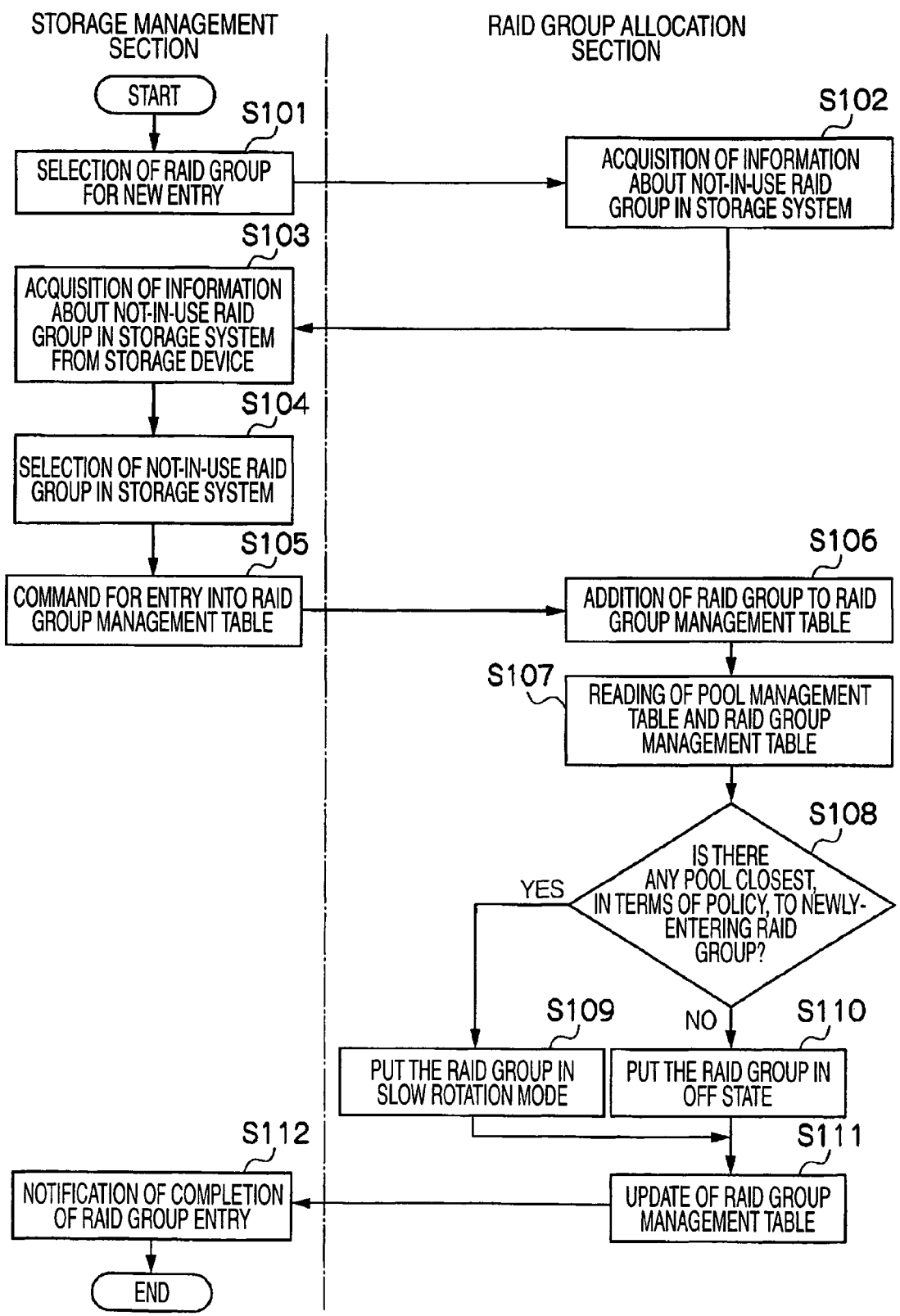
FIG. 14 is a flowchart of a RAID group new entry process of the first embodiment.

FIG. 14 is a flowchart of a RAID group new entry process. The RAID group new entry process is executed to enter information about RAID groups in the storage system 1 into the RAID group management table 400, and to put the RAID groups in a state ready for automatic allocation in accordance with a policy of the pool. As shown in FIG. 14, the RAID group new entry process is executed by the storage management section 111 and the RAID group allocation section 223. Note that the storage management section 121 may surely execute the process as an alternative to the storage management section 111.

When an operator makes a selection of "RAID group new entry", in step S101, the storage management section 111 forwards information indicating that the selection of "RAID group new entry" is made to the RAID group allocation section 223.

In step S102, the RAID group allocation section 223 acquires information about any RAID groups not yet used in the storage device 200, and then forwards thus acquired information to the storage management section 111.

In step S103, the storage management section 111 receives the information about the RAID groups not yet used in the storage device 200. In step S104, the storage management section 111 then selects any one specific not-yet-used RAID group from the acquired information. Then in step S105, the storage management section 111 forwards, to the RAID group allocation section 223, a command for entering thus selected RAID group into the RAID group management table 400.

In step S106, the RAID group allocation section 223 enters, into the RAID group management table 400, the selected RAID group provided in step S105. In step S107, the RAID group allocation section 223 reads the pool management table 500 and the RAID group management table 400, and then in step S108, a determination is made whether or not there is any pool closest, in terms of policy, to the RAID group entered as such.

When there is such a pool (S108: YES), the procedure goes to step S109, and the RAID group allocation section 223 sets the RAID group in the "slow rotation" mode. On the other hand, when there is no such pool (S108: NO), the procedure goes to step S110, and the RAID group allocation section 223 puts the RAID group in the "OFF" state.

The reason for setting the RAID groups differently as such is as follows. That is, there may be a case where the RAID group to be entered may be closest, in terms of policy, to any of the pools in the pool management table 500. If this is the case, because it is highly possible that the RAID group to be entered is an immediate target for capacity increase, the RAID group is put in the "slow rotation" mode with which the capacity addition to the pool can be completed in a shorter time. On the other hand, when the RAID group being a capacity reduction target does not match any of the pool policies, it means that the RAID group may not be put in operation for a while so that the power is turned OFF.

In step S111, the RAID group allocation section 223 updates the RAID group management table 400, and notifies as such to the storage management section 111.

Instep S112, the storage management section 111 notifies the operator of completion of RAID group entry. This is the end of the RAID group new entry process.

Figure 15:
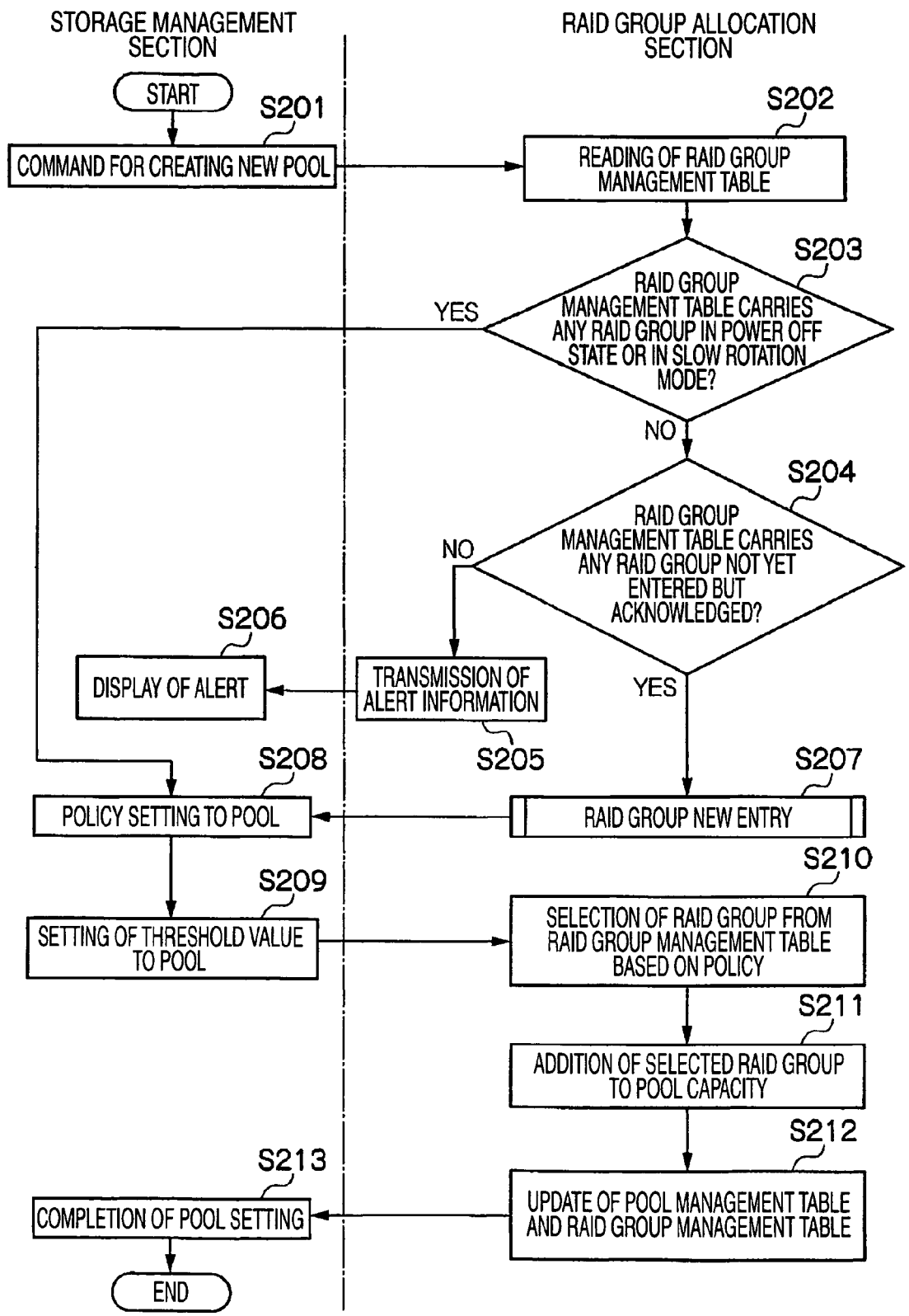
FIG. 15 is a flowchart of a pool setting process of the first embodiment.

FIG. 15 is a flowchart of a pool setting process. With the pool setting process, a pool newly set with a policy is created, and the resulting pool is allocated with any of the RAID groups in the RAID group management table 400. As shown in FIG. 15, the pool setting process is executed by the storage management section 111 and the RAID group allocation section 223. Note that the storage management section 121 may surely execute the process as an alternative to the storage management section 111.

When receiving a command from the operator for creating a new pool, in step S201, the storage management section 111 issues a command to the RAID group allocation section 223 for creating a new pool.

In step S202, the RAID group allocation section 223 reads the RAID group management table 400. Then in step S203, the RAID group allocation section 223 determines whether the RAID group management table 400 carries therein any RAID group in the "OFF" state or in the "slow rotation" mode.

When the determination result tells that there is such a RAID group (S203: YES), the procedure goes to step S208. When the determination result tells that there is no such RAID group (S203: NO), in step S204, the RAID group allocation section 223 determines whether or not there is any RAID group not found in the RAID management table 400 but is acknowledged.

When there is no such RAID group (S204: NO), in step S205, the RAID group allocation section 223 forwards information of alert to the storage management section 111. Then in step S206, the storage management section 111 displays, for the operator, an alert message telling that no pool can be created because there is no RAID group.

When there is such a RAID group (S204: YES), in step S207, the RAID group allocation section 223 executes the RAID group new entry process. This enables acknowledging of, as a RAID group, any hard disk drive disposed and acknowledged in the storage device 200 but is not entered as a RAID group.

In step S208, in response to a command coming from the operator, the storage management section 111 sets the pool with a policy. In step S209, in response to a command coming from the operator, the storage management section 111 sets the pool with a threshold value. Such information is forwarded to the RAID group allocation section 223.

In step S210, based on the policy, the RAID group allocation section 223 selects any of the RAID groups from the RAID group management table 400. In step S211, the RAID group allocation section 223 adds thus selected RAID group to the pool capacity. Then in step S212, the RAID group allocation section 223 updates the pool management table 500 and the RAID group management table 400.

In step S213, the storage management section 111 completes the pool setting.

Figure 16:
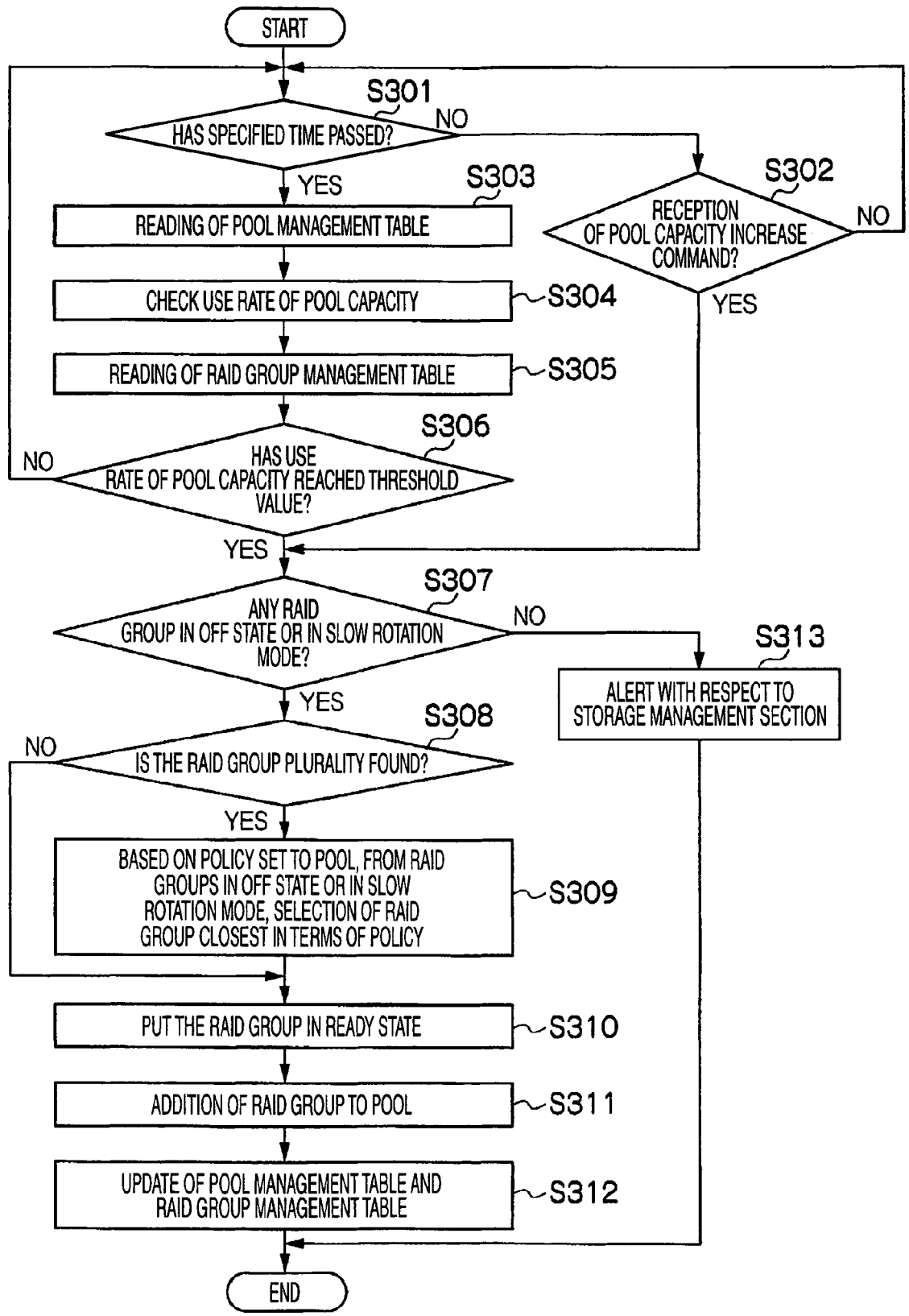
FIG. 16 is a flowchart of the pool capacity increase process of the first embodiment.

FIG. 16 is a flowchart of the pool capacity increase process. In the pool capacity increase process, a pool is set, and while the pool set as such is being used, the pool capacity is increased in units of a RAID group in accordance with the policy set to the pool. This pool capacity increase process is to be executed by the RAID group allocation section 223.

The RAID group allocation section 223 determines in step S301 whether a predetermined time has been passed or not. When the determination result tells not yet (S301: NO), the procedure goes to step S302. In step S302, the RAID group allocation section 223 then determines whether a pool capacity increase command is provided or not. When the determination result tells not yet (S302: NO), the procedure returns to step S301. That is, the RAID group allocation section 223 monitors the lapse of a predetermined time, and whether a pool capacity increase command is provided or not. Herein, the predetermined time may be a preset time interval, or a time designated by the operator.

When the determination result tells that the predetermined time has been passed (S301: YES), in step S303, the RAID group allocation section 223 reads the pool management table 500. In step S304, the RAID group allocation section 223 checks the use rate of the pool capacity. In step S305, the RAID group allocation section 223 reads the RAID group management table. Then in step S306, the RAID group allocation section 223 determines whether the use rate of the pool capacity has reached the threshold value or not. When the determination result tells not yet (S306: NO), the procedure returns to step S301.

When the determination result tells that the use rate has reached the threshold value (S306: YES), or when the pool capacity increase command is provided (S302: YES), in step S307, the RAID group allocation section 223 determines whether there is any RAID group in the "OFF" state or in the "slow rotation" mode. When there is no such RAID group (S307: NO), in step S313, the RAID group allocation section 223 issues an alert message to the storage management section 111. In this manner, the operator can be notified that the pool capacity cannot be automatically increased.

When there is such a RAID group (S307: YES), in step S308, the RAID group allocation section 223 determines whether or not such a RAID group is plurally found. When there are a plurality of such RAID groups (S308: YES), in step S309, from the RAID groups in the "OFF" state or in the "slow rotation" mode, the RAID group allocation section 223 selects, based on the policy set to the pool, any of the RAID group closest in terms of policy.

When such a RAID group is not plurally found (S308: NO), or when any RAID group is selected in step S309, in step S310, the RAID group allocation section 223 puts the RAID group in the ready state. That is, when being in the "OFF" state, the RAID group is turned ON, and when being in the "slow rotation" mode, the RAID group is rotated faster.

In step S311, the RAID group allocation section 223 adds the RAID group to the pool. In step S312, the RAID group allocation section 223 updates the pool management table 500, and the RAID group management table 400. This is the end of the process.

Figure 17:
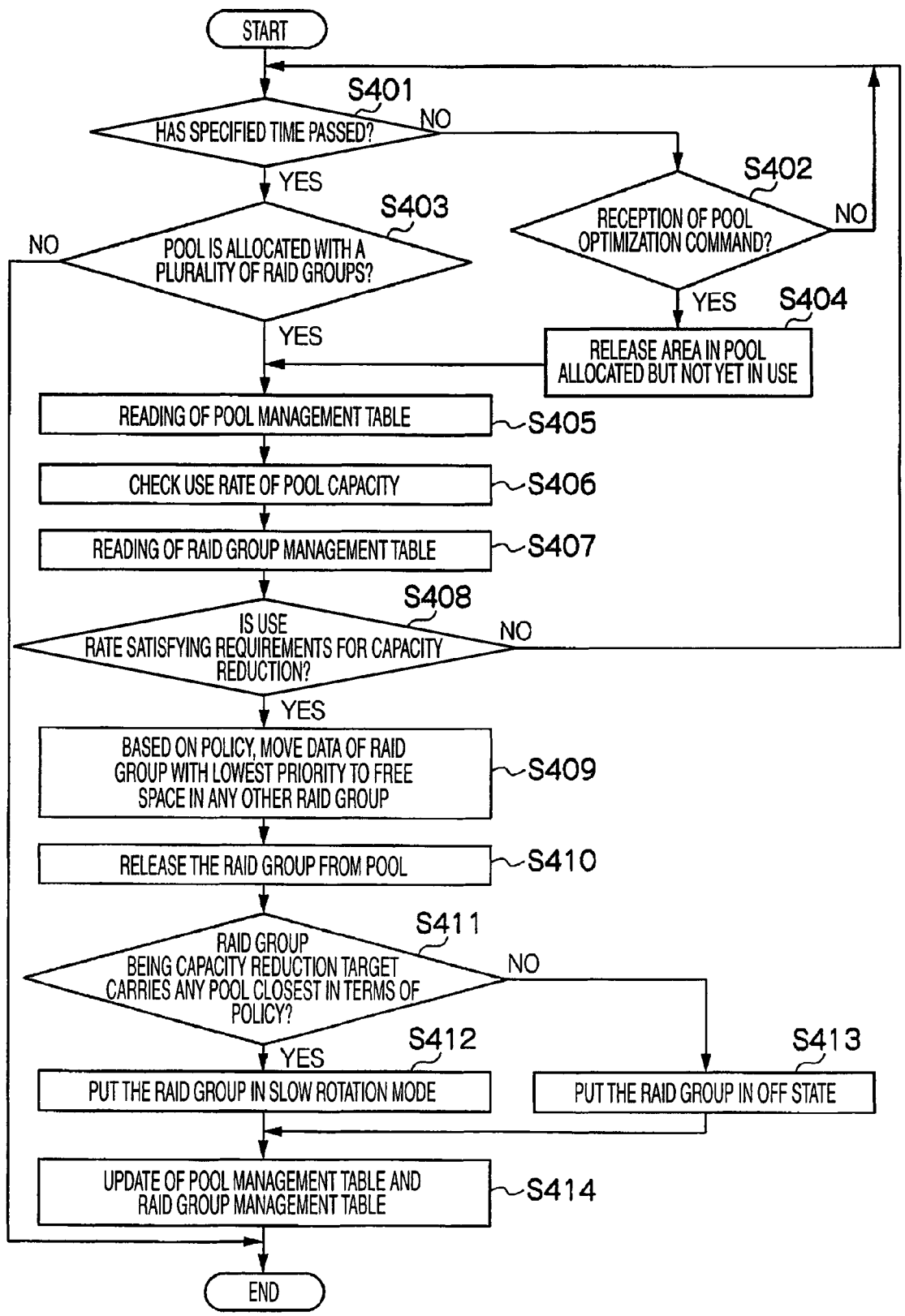
FIG. 17 is a flowchart of the pool capacity reduction process and a pool capacity optimization process of the first embodiment.

FIG. 17 is a flowchart of the pool capacity reduction process and a pool capacity optimization process. In the pool capacity reduction process, a pool is set, and while the pool set as such is being used, the pool capacity is reduced in units of a RAID group in accordance with the policy set to the pool. In the pool optimization process, any area in the pool that has been allocated to the virtual volume but is not yet used is released, thereby increasing the free space in the pool. Thereafter, when the capacity of the pool satisfies requirements for capacity reduction, the capacity is accordingly reduced. These processes, i.e., the pool capacity reduction process and the pool capacity optimization process, are both executed by the RAID group allocation section 223.

The RAID group allocation section 223 determines in step S401 whether a predetermined time has been passed or not. When the determination result tells not yet (S401: NO), the procedure goes to step S402. In step S402, the RAID group allocation section 223 then determines whether a pool optimization command is provided or not. When the determination result tells not yet (S402: NO), the procedure returns to step S401. That is, the RAID group allocation section 223 monitors the lapse of a predetermined time, and whether a pool optimization command is provided or not. Herein, the predetermined time may be a preset time interval, or a time designated by the operator.

When the determination result tells that the predetermined time has been passed (S401: YES), in step S403, the RAID group allocation section 223 determines whether or not the pool is allocated with a plurality of RAID groups. When the pool is not allocated with a plurality of RAID groups (S403: NO), this is the end of the process.

When the pool is allocated with a plurality of RAID groups (S403: YES), or when the pool optimization command is received (S402: YES) and when the RAID group allocation section 223 releases any area in step S404, i.e., any area in the pool that has been allocated to the virtual volume but is not yet used, the procedure goes to step S405.

In step S405, the RAID group allocation section 223 reads the pool management table 500. In step S406, the RAID group allocation section 223 checks the use rate of the capacity of the pool. In step S407, the RAID group allocation section 223 reads the RAID group management table. Then in step S408, the RAID group allocation section 223 determines whether the use rate satisfies the requirements for capacity reduction or not. When the requirements are not satisfied (S408: NO), the procedure returns to step S401.

Herein, the requirements for capacity reduction are determined by the following equation (1).

$$\text{Threshold Value (\%)} > Pc/(Pt-Rt) \times 100 + \alpha \quad (1)$$

where Pt denotes the entire capacity of a pool, Pc denotes the entire amount of use of the pool, Rt denotes the capacity of a RAID group with the lowest priority, and a denotes the free space at the time of capacity reduction (arbitrary value).

When the requirements are satisfied (S408: YES), in step S409, the RAID group allocation section 223 moves, based on the policy, the data of the RAID group with the lowest priority to the free space of any other RAID group. In step S410, the RAID group allocation section 223 releases the RAID group from the pool.

In step S411, the RAID group allocation section 223 determines whether or not there is any pool closest, in terms of policy, to the RAID group being the capacity reduction target. When there is such a pool (S411: YES), in step S412, the RAID group allocation section 223 sets the RAID group in the "slow rotation" mode. When there is no such pool (S411: NO), the procedure goes to step S413, and the RAID group allocation section 223 sets the RAID group in the "OFF" state. The reason for setting the RAID groups differently as such is the same as that described above in step S108, and thus is not described twice.

In step S414, the RAID group allocation section 223 updates the pool management table 500 and the RAID group management table 400. This is the end of the process.

In the first embodiment described above, the storage system 1 can implement reduction of power consumption, simplification of management, and increase of use efficiency of storage resources.

The storage system 1 also can perform electrical control in units of a RAID group in accordance with the application of a pool and the capacity use rate thereof. Moreover, because the RAID management table 400 is shared among a plurality of pools 720, the spare storage capacity that has been required to be ready for every pool can be shared among the pools 720, thereby being able to use the capacity with good efficiency.

Moreover, when the capacity use rate of the pool 720 reaches the threshold value, the storage system 1 automatically selects any RAID group considered appropriate based on the policy from the RAID group management table 400, i.e., RAID group 730, and the capacity of the pools 720 is increased by turning ON the virtual volume or increasing the rotation speed thereof. This favorably saves the trouble of an operator to frequently monitor the capacity use rate, and to increase the capacity manually.

Further, the storage system 1 automatically selects any RAID group considered appropriate based on the policy of the pool 720 from the RAID group management table 400, i.e., RAID group 730, and the data in the RAID group 730 is entirely moved to any other RAID group 730 in the same pool 720. The storage system 1 then turns OFF the selected RAID group 730 or put it in the "slow rotation" mode, and enters the RAID group 730 again in the RAID group management table 400. In this manner, the hard disk drive 240 can be increased in capacity use rate and in electrical efficiency with respect to the capacity of the hard disk drive 240 in use can be increased.

The storage system 1 also deletes the zero data of the virtual volume 710 that has been written at the time of data transfer from the virtual volume 710, and deletes any extra data having been allocated as a physical storage area. The storage system 1 then performs data transfer to the virtual volume 710, thereby enabling the efficient use of the capacity to be increased. The RAID group 730 being the transfer source is added to the RAID group management table 400 of the pool 720, and then is turned OFF or is put into the "slow rotation" mode to be ready for the next use as the capacity of the pool 720. In this manner, the physical storage area can be increased in use efficiency and power saving can be achieved.

Moreover, when the data in the virtual volume 710 is deleted from the host computer 100, the storage system 1 releases any area to which the data has been allocated in the virtual volume 710, thereby increasing the free space.

Second Embodiment

Exemplified in the first embodiment is the case that the pool reduction process is executed automatically. Alternatively, an operator may be notified of any RAID group to be reduced, and the reduction process may be executed in response to a command issued by the operator.

Figure 18:
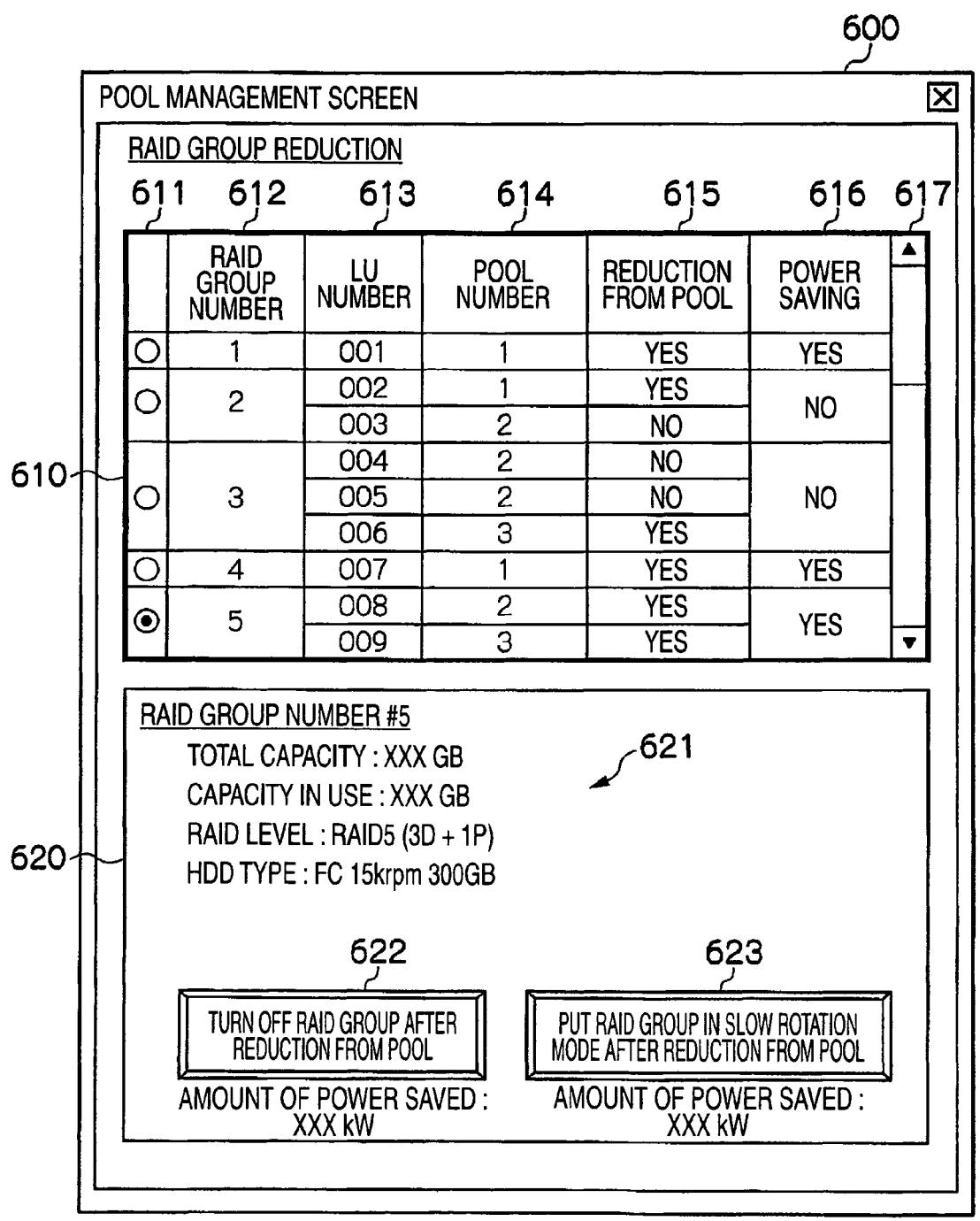
FIG. 18 is a diagram showing an exemplary screen display at the time of RAID group reduction in a second embodiment of the invention.

FIG. 18 is a diagram showing an exemplary screen display of a pool management screen at the time of RAID group reduction. This screen display 600 is to be displayed at the time of the RAID group reduction process that will be described later. This pool management screen may be displayed on the computer 110, or on the maintenance terminal 120.

The screen display 600 includes a table 600 and a detailed information area 610. The table 600 displays potential RAID group(s) to be reduced, and the detailed information area 610 displays the detailed information of the RAID group(s).

The table 600 includes a designation field 611, a RAID group number field 612, an LU number field 613, a pool number field 614, a reduction YES/NO field 615, a power saving YES/NO field 616, and a scroll bar field 617.

The designation field 611 designates any of the RAID groups for display of detailed information on the detailed information area 610. The RAID group number field 612 displays the number(s) of the RAID group(s) to be reduced. The RAID group number(s) displayed here is a list of any RAID groups that are under the management of the RAID group management table 400, and are being turned ON.

The LU number field 613 displays LU numbers of the LUs configuring the RAID group. The pool number field 614 displays the numbers of the pools. The reduction YES/NO field 615 displays whether the RAID group can be reduced or not, i.e., the determination of YES/NO is made based on whether the RAID group or the LU is satisfying the requirements for pool capacity reduction or not. The power saving YES/NO field 818 displays whether the RAID group can be put in the state of power saving or not. Assuming that in a RAID group, a plurality of LUs are placed across a plurality of pools, when every LU can be reduced from the pool, the RAID group can be put in the state of power saving. The scroll bar field 617 displays the RAID group(s) not displayed on the table 610 by scrolling the screen.

The detailed information area 620 displays the detailed information of the RAID group designated by the designation field 611. The detailed information display 621 of the detailed information includes, specifically, the entire capacity, the amount of use, the RAID level, and the HDD type.

The detailed information area 620 displays reduction buttons 622 and 623. The reduction button 622 is provided for issuing a command for turning OFF the RAID group after capacity reduction of the pool. The reduction button 623 is provided for issuing a command for putting the RAID group into the "slow rotation" mode after capacity reduction from the pool. Herein, below these reduction buttons 622 and 623, a display is made to indicate their power saving effect.

As such, an operator can save power by referring to the display screen 600 at the time of RAID group reduction process.

Other Embodiment

In the above embodiments, the invention is described with an application to the storage device 200 storing data from the host computer 100 in one or more hard disk drives 240 via the virtual volume 710. The storage device 200 is exemplified as including: the RAID group management table 400 that manages storage areas provided by one or more hard disk drives 240 on the basis of a RAID group created using one or more parameters; the pool management table 500 that manages, for every hard disk drive 240 of a pool configured by at least one or more RAID groups under the management of the RAID group management table 400, a policy related to the capacity of the pool and a threshold value of the storage capacity of the pool; the RAID group power supply control section 222 that performs control on a RAID group basis, i.e., any RAID group 730 used in the pool is put in a turn-ON state, and any RAID group 730 not used in the pool is put in a turn-OFF state or in a slow rotation mode for power saving; and the RAID group allocation section 223 that selects, when the storage capacity of the pool exceeds the threshold value, any appropriate RAID group 730 based on the policy of the pool and the parameters under the management of the RAID group management table 400, and after making the RAID group power supply control section 222 to change the state, i.e., from the OFF state or the slow rotation mode to the ON state, of the hard disk drive 240 configuring the RAID group 730 selected by the RAID group power supply control section 222, adds the RAID group 730 to the capacity of the pool. The invention is not surely restrictive thereto.

The invention can be widely applied to the storage device and the control method thereof.

What is claimed is:

1. A storage device that stores data from a host computer in one or more hard disk drives via a virtual volume, the storage device comprising:
a first management section that manages a storage area provided by the one or more hard disk drives on a basis of a predetermined unit created using one or more parameters;
a second management section that manages, on a basis of a pool configured by at least one or more of the units under the management of the first management section, a management policy about a capacity of a plurality of pools and a threshold value of a storage capacity of the pools;
a power supply control section that controls each of the hard disk drives of the unit under the management of the first management section to be in either a first turn-ON state or a second turn-ON state with a low power consumption; and
a control section that selects, when the storage capacity of any of the pools exceeds the threshold value, the management policy of the pool, and any of the parameters considered optimum to serve as the unit of the storage area under the management of the first management section, and after making the power supply control section to change the state of the hard disk drive of the selected unit from the second turn-ON state to the first turn-ON state, adds the unit of the storage area to the capacity of the pool, and
wherein the pools are each configured using a plurality of the units, and when the capacity of any of the pools satisfies preset pool reduction requirements, the control section transfers data stored in any of the units to any of the remaining units., and after making the power supply control section to change the state of the hard disk drive of the data-transferred unit from the first turn-ON state to the second turn-ON state, removes the unit from the capacity of the pool, and
wherein for the data transfer, the control section performs the data transfer via the virtual volume, and deletes zero data in the virtual volume.

2. The storage device according to claim 1, wherein after completion of pool capacity increase, the control section updates information under the management of the first and second management sections.

3. The storage device according to claim 1, wherein the unit is a RAID (Redundant Arrays of Inexpensive Disks) group.

4. The storage device according to claim 1, wherein the management policy is any of performance critical, capacity critical, power consumption critical, and reliability critical.

5. The storage device according to claim 1, wherein the control section monitors the capacity of the pools under the management of the second management section at predetermined time intervals, and when the storage capacity of any of the pools exceeds the predetermined threshold value, or when a pool addition command is provided from the host computer, increases the capacity of the pool.

6. The storage device according to claim 1, wherein after completion of pool capacity reduction, control section updates information under the management of the first and the second management sections.

7. The storage device according to claim 6, wherein the hard disk drive of the unit changed into the second turn-ON state after the update is a target for the pool capacity increase.

8. The storage device according to claim 1, wherein when the zero data is deleted, the control section releases an area allocated with zero data.

9. The storage device according to claim 1, wherein the control section monitors the capacity of the pools under the management of the second management section at predetermined time intervals, and when the storage capacity of any of the pools exceeds the predetermined threshold value, or when a pool optimization command is provided from the host computer, reduces the capacity of the pool.

10. A method for controlling a storage device that stores data from a host computer in one or more hard disk drives via a virtual volume, the storage device comprising:
   a first management section that manages a storage area provided by the one or more hard disk drives on a basis of a predetermined unit created using one or more parameters;
   a second management section that manages, on a basis of a pool configured by at least one or more of the units under the management of the first management section, a management policy about a capacity of a plurality of the pools and a threshold value of a storage capacity of the pools, the pools each being configured using a plurality of units; and
   a power supply control section that controls each of the hard disk drives of the unit under the management of the first management section to be in either the first turn-ON state or a second turn-ON state with a low power consumption, and
the method comprising the steps of:
   selecting, when the storage capacity of any of the pools exceeds the threshold value, the management policy of the pool, and any of the parameters considered optimum to serve as the unit of the storage area under the management of the first management section;
   making the power supply control section to change the state of the hard disk drive of the selected unit from the second turn-ON state to the first turn-ON state;
   adding the selected unit to the capacity of the pool;
   upon the capacity of any of the pools satisfies preset pool reduction requirements, transferring data stored in any of the units to any of the remaining units via the virtual volume and deleting zero data in the virtual volume;
   making the power supply control section to change the state of the hard disk drive of the data-transferred unit from the first turn-ON state to the second turn-ON state; and
   removing the data-transferred unit from the capacity of the pool.

11. The storage device control method according to claim 10, further including the step of, before the selecting step:
   determining whether or not the storage capacity of any of the pools exceeds the predetermined threshold value through monitoring of the capacity of the pools under the management of the second management section at predetermined time intervals, or receiving a pool addition command from the host computer.

12. The storage device control method according to claim 10, further including the step of, before the transferring step:
   determining whether or not the storage capacity of any of the pools exceeds the predetermined threshold value through monitoring of the capacity of the pools under the management of the second management section at predetermined time intervals, or receiving a pool optimization command from the host computer.

* * * * *